United States Patent
Kishi et al.

(10) Patent No.: US 8,172,306 B2
(45) Date of Patent: May 8, 2012

(54) WHEEL-ARCH PROTECTOR FOR VEHICLE

(75) Inventors: Shinichi Kishi, Wako (JP); Hiroyuki Taki, Obu (JP)

(73) Assignees: Honda Motor Co., Ltd., Tokyo (JP); Tokai Kogyo Co., Ltd., Ohbu-Shi (JP)

( * ) Notice: Subject to any disclaimer, the term of this patent is extended or adjusted under 35 U.S.C. 154(b) by 39 days.

(21) Appl. No.: 12/621,343

(22) Filed: Nov. 18, 2009

(65) Prior Publication Data

US 2011/0115253 A1    May 19, 2011

(51) Int. Cl.
*B62D 25/18* (2006.01)
(52) U.S. Cl. .................. 296/146.9; 296/151; 280/153.5; 280/154; 280/851
(58) Field of Classification Search .................. 296/198, 296/93, 146.9, 151; 280/847, 153.5, 154, 280/848, 851
See application file for complete search history.

(56) References Cited

U.S. PATENT DOCUMENTS

| 6,138,415 A * | 10/2000 | Ohtsu et al. ................... 49/490.1 |
| 6,386,619 B1 * | 5/2002 | Tsuchida .................... 296/146.9 |
| 2004/0217620 A1 * | 11/2004 | Matsco et al. .................. 296/90 |
| 2007/0209286 A1 * | 9/2007 | Nadano ........................ 49/498.1 |

FOREIGN PATENT DOCUMENTS

JP    2006-264370 A    10/2006

* cited by examiner

*Primary Examiner* — Dennis Pedder
*Assistant Examiner* — Jason S Daniels
(74) *Attorney, Agent, or Firm* — Westerman, Hattori, Daniels & Adrian, LLP

(57) ABSTRACT

A wheel-arch protector mounted on the rear edge of a side door for covering a wheel arch for a rear wheel, the wheel-arch protector including a protector body formed from a polymer material and a seal part formed from a polymer material that elastically deforms more readily than the polymer material for forming the protector body. The body includes a mounting baseplate, a extending plate, and a distended part. The extending plate extends from an end of the mounting baseplate to outside in a widthwise direction of the vehicle. The distended part is distended to an inner angle part of a corner between the mounting baseplate and the extending plate and has a hollow part. The seal part is comprised of a basal part formed on a vehicle-interior-facing surface of the mounting baseplate and a seal-lip part formed on the basal part.

2 Claims, 10 Drawing Sheets

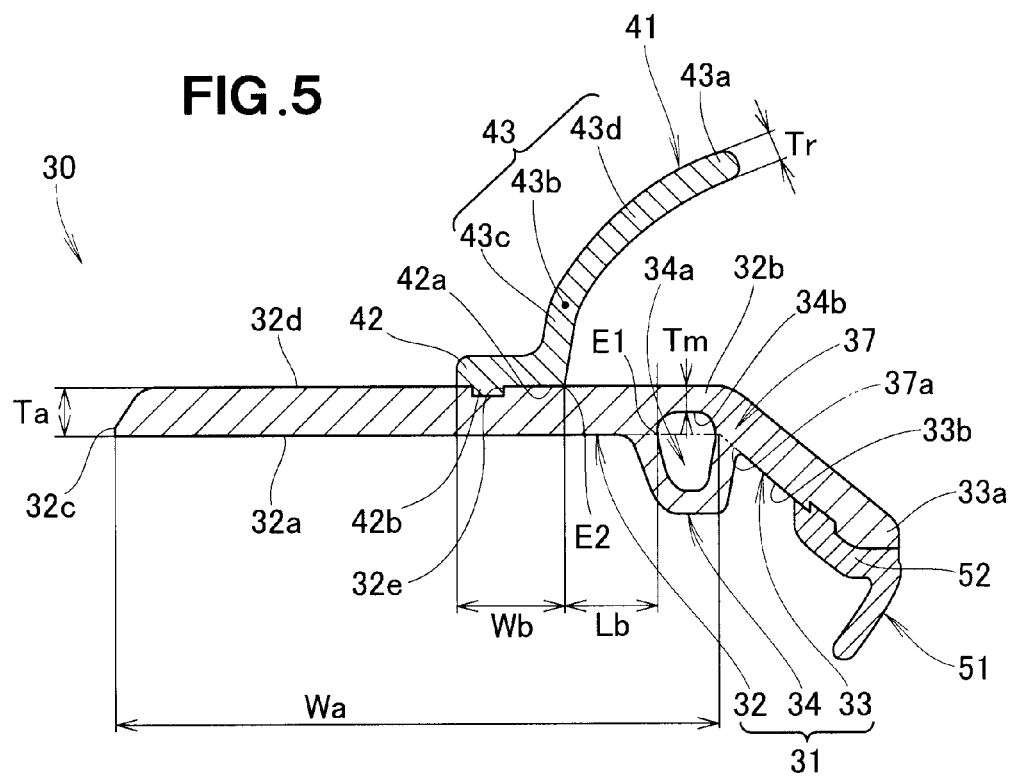
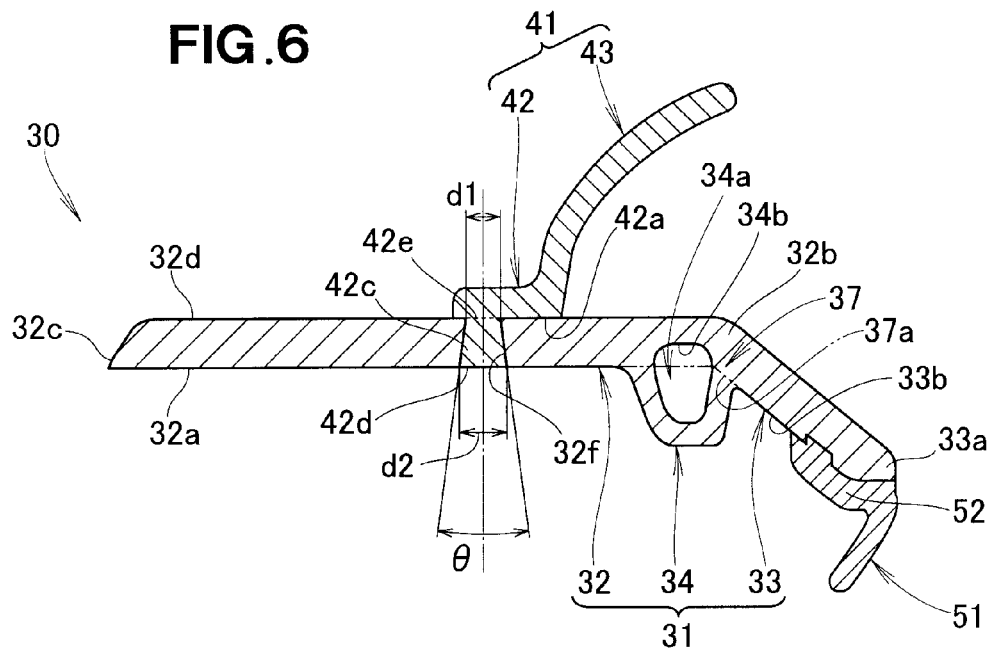

WHEEL-ARCH PROTECTOR FOR VEHICLE

FIELD OF THE INVENTION

The present invention relates to a wheel-arch protector mounted on an edge of a side door of a vehicle for covering, jointly with the side door, a wheel arch that forms a rim of a wheel housing when the side door is closed, from outside in a direction of width of the vehicle.

BACKGROUND OF THE INVENTION

In certain vehicle types, a wheel-arch protector is used to cover a wheel arch from the outside in the widthwise direction of the vehicle when a side door is closed. The wheel arch is formed on a body panel that constitutes an outer plate of the vehicle body. A method for covering the wheel arch using a wheel-arch protector is well-known from JP 2006-264370 A.

A summary of the method disclosed in JP 2006-264370 A will be described below with reference to FIGS. 11A and 11B hereof. FIG. 11A shows a partial lateral view of a vehicle 100 that has a conventional wheel-arch protector 110, while FIG. 11B shows a cross-section along the line B-B of the vehicle 100 shown in FIG. 11A.

The conventional vehicle 100 is provided with a side door 102 adjoining a rear wheel 101, as shown in FIGS. 11A and 11B. A wheel arch 105 that constitutes the rim of a wheel housing 104 for receiving the rear wheel 101 is formed on a vehicle-body panel 103. A cutout part 106 that is formed in an arcuate shape along the wheel arch 105 is present on a lower rear part on the edge of the side door 102. The wheel-arch protector 110 is attached to a back surface 102a of the side door 102 and is formed in an arcuate shape so as to follow the cutout part 106.

The wheel-arch protector 110 is a molded article integrally formed from a hard resin and is comprised of a mounting baseplate 111, a extending plate 112, and a shielding plate 113. The mounting baseplate 111 is mounted and overlaid on the back surface 102a of the side door 102. The extending plate 112 extends from one end of the mounting baseplate 111 along the cutout part 106 so as to face an outer surface 102b of the side door 102. The shielding plate 113 extends from a corner 114 between the mounting baseplate 111 and the extending plate 112 toward the inside of the wheel housing 104. The gap between the vehicle-body panel 103 and the back surface 102a of the side door 102 is covered by the shielding plate 113 when the side door 102 is closed. The shielding plate 113 is formed integrally with a portion of the corner 114, and therefore the entirety of the wheel-arch protector 110 is rigid.

However, the shielding plate 113 is composed of a hard resin, and therefore a gap 121 of at least a certain size must be present between the shielding plate 113 and the wheel arch 105. Improvements are necessary to improve sound insulation and water proofing in the region of the gap 121. The shielding plate 113 is also exposed to the outside when the side door 102 is open. The shielding plate 113 must be made more resistant to external impact, which is disadvantageous in terms of keeping the cost of the wheel-arch protector 110 low.

Alternatively, it is possible to consider configuring the entire wheel-arch protector from a soft resin. If a soft resin is used, then by adopting a structure wherein the shielding plate 113 contacts the wheel arch 105, the gap 121 can be eliminated. The shielding plate 113 will also be pliable and therefore durable.

However, the rigidity of the entire wheel-arch protector 110 cannot be increased if the shielding plate 113 is pliable. Further improvements are required to increase the rigidity of the wheel-arch protector 110.

Accordingly, technology is needed for improving the seal between the wheel arch and the wheel-arch protector and for increasing the rigidity of the wheel-arch protector.

SUMMARY OF THE INVENTION

According to the present invention, there is provided a vehicular wheel-arch protector mounted to a cutout part at an edge of a side door of a vehicle, the cutout part being formed to follow a contour of a rear wheel of the vehicle, the side door being positioned adjacent to and forwardly of the rear wheel for opening and closing a door opening formed in a vehicle-body panel forming a lateral side part of the vehicle, the wheel-arch protector comprising: a protector body formed from a polymer material; and a seal part formed from a polymer material that elastically deforms more readily than the polymer material for forming the protector body, both the protector body and the seal part being formed to follow at least a part of a contour of the cutout part, wherein the protector body comprises: a mounting baseplate formed at a predetermined width corresponding to a vehicle-interior-facing surface of the side door and mounted on the vehicle-interior-facing surface; a extending plate extending from one widthwise end of the mounting baseplate along the cutout part toward outside in a widthwise direction of the vehicle; and a distended part distended toward the outside in the widthwise direction of the vehicle from a vehicle-exterior-facing surface of a corner between the mounting baseplate and the extending plate, the distended part being formed long and thin so as to follow the cutout part and having a hollow part that is long and thin so as to follow the cutout part, the seal part having a basal part formed integrally with a vehicle-interior-facing surface of the mounting baseplate and a seal-lip part formed integrally with the basal part, the basal part being positioned away from the hollow part toward another widthwise end of the mounting baseplate, the seal-lip part being designed to seal a space between an outer surface of the vehicle-body panel and the mounting baseplate in a state in which the side door is fully closed.

The wheel-arch protector is thus configured from a protector body formed from a polymer material and a seal part formed from a polymer material that elastically deforms more readily than the polymer material for forming the protector body. The space between the vehicle-body panel and the mounting baseplate can therefore be adequately sealed by the seal part when the door opening of the vehicle-body panel is closed by the side door. The seal part prevents water droplets from seeping into the vehicle interior from the outside and exhibits excellent sound insulation. The seal part is also pliable, and accordingly highly durable as well as being less likely to break. Sealing functionality can therefore be maintained for long periods of time.

The distended part is distended to the outside in the widthwise direction of the vehicle from a surface of the corner between the mounting baseplate and the extending plate, where the surface faces the outside of the vehicle. The corner can therefore be kept rigid by the distended part. As a result, the rigidity of the entire wheel-arch protector increases. The durability of the corner can also be maintained even when external forces; e.g., the impact of rocks kicked up by the rear wheel, act on the corner.

The hollow part is formed inside the distended part, and therefore the substantive thickness of the corner can be reduced, despite the presence of the distended part at the corner. Sink marks (dents in the surface of a molded article) can therefore be prevented from appearing in the portion of the corner when the protector body is molded.

Heat and pressure are generally produced in the step for integrally molding the basal part of the seal part on the mounting baseplate. However, the basal part of the seal part is set apart from the hollow part toward the other end in the width direction of the mounting baseplate. The heat and pressure generated accordingly do not exert a direct effect on the wall for forming the hollow part. Therefore, the wall for forming the hollow part can be kept from breaking, and the corner can be kept rigid and durable.

Preferably, a width of the basal part in a cross-section of a surface perpendicular to a direction following the cutout part is made larger than a thickness of the seal-lip part.

Desirably, the seal-lip part extends from the basal part while slanting toward the vehicle-body panel and the rear of a vehicle body.

In a preferred form, the seal-lip part has an inflection point between the basal part and a distal end; and a portion spanning from the inflection point to the distal end is preferably slanted relative to a portion spanning from the basal part to the inflection point.

The mounting baseplate and the basal part preferably have concave and convex parts and are formed integrally, the concave and convex parts fitting together.

The mounting baseplate preferably has a through-hole passing through a front-back direction of the mounting baseplate; the basal part preferably has an anchor part filled into the through-hole; and the anchor part is preferably formed from the same material as the basal part.

The through-hole and the anchor part preferably taper to a small diameter from a distal end of the anchor part to a vicinity of the basal part.

BRIEF DESCRIPTION OF THE DRAWINGS

Certain preferred embodiments of the present invention will be described in detail below, by way of example only, with reference to the accompanying drawings, in which:

FIG. 5 is a cross-sectional view taken along line 5-5 of FIG. 4;

FIG. 6 is a cross-sectional view taken along line 6-6 of FIG. 4;

DETAILED DESCRIPTION OF THE PREFERRED EMBODIMENTS

Figure 1:
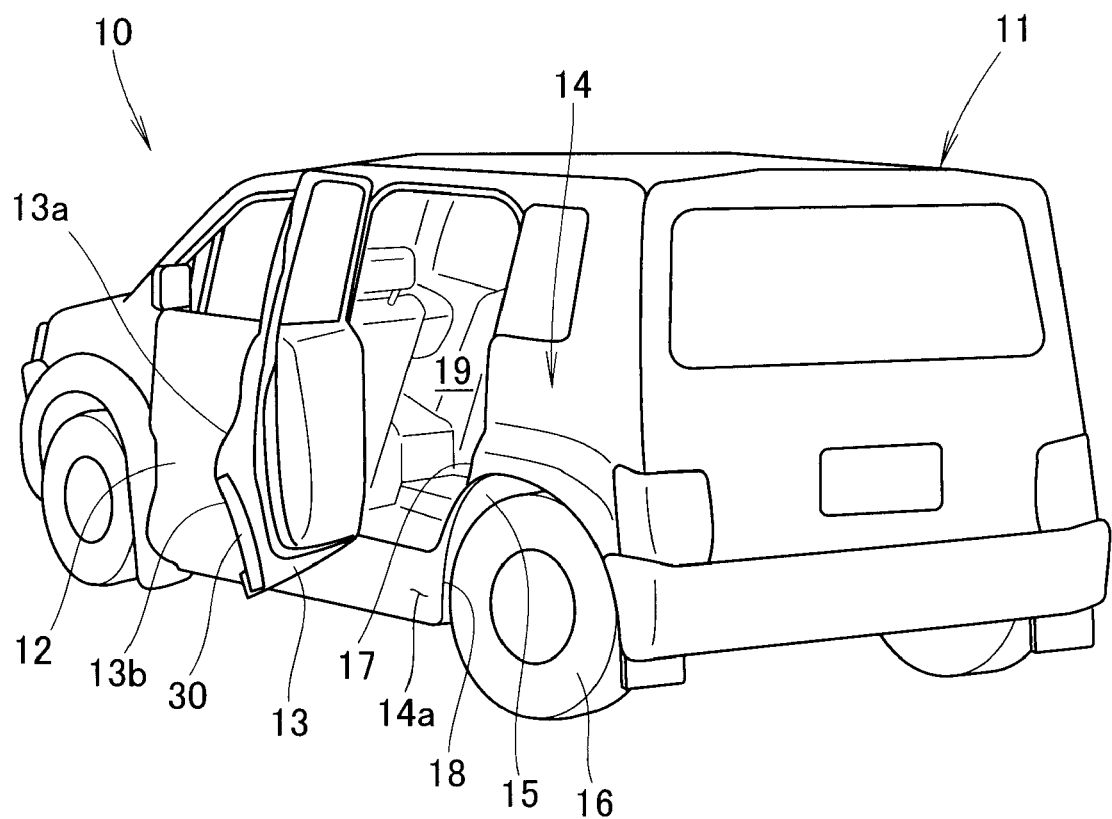
FIG. 1 is a perspective view illustrating a vehicle provided with a wheel-arch protector according to the present invention, with a rear door placed in an open state.
Figure 2:
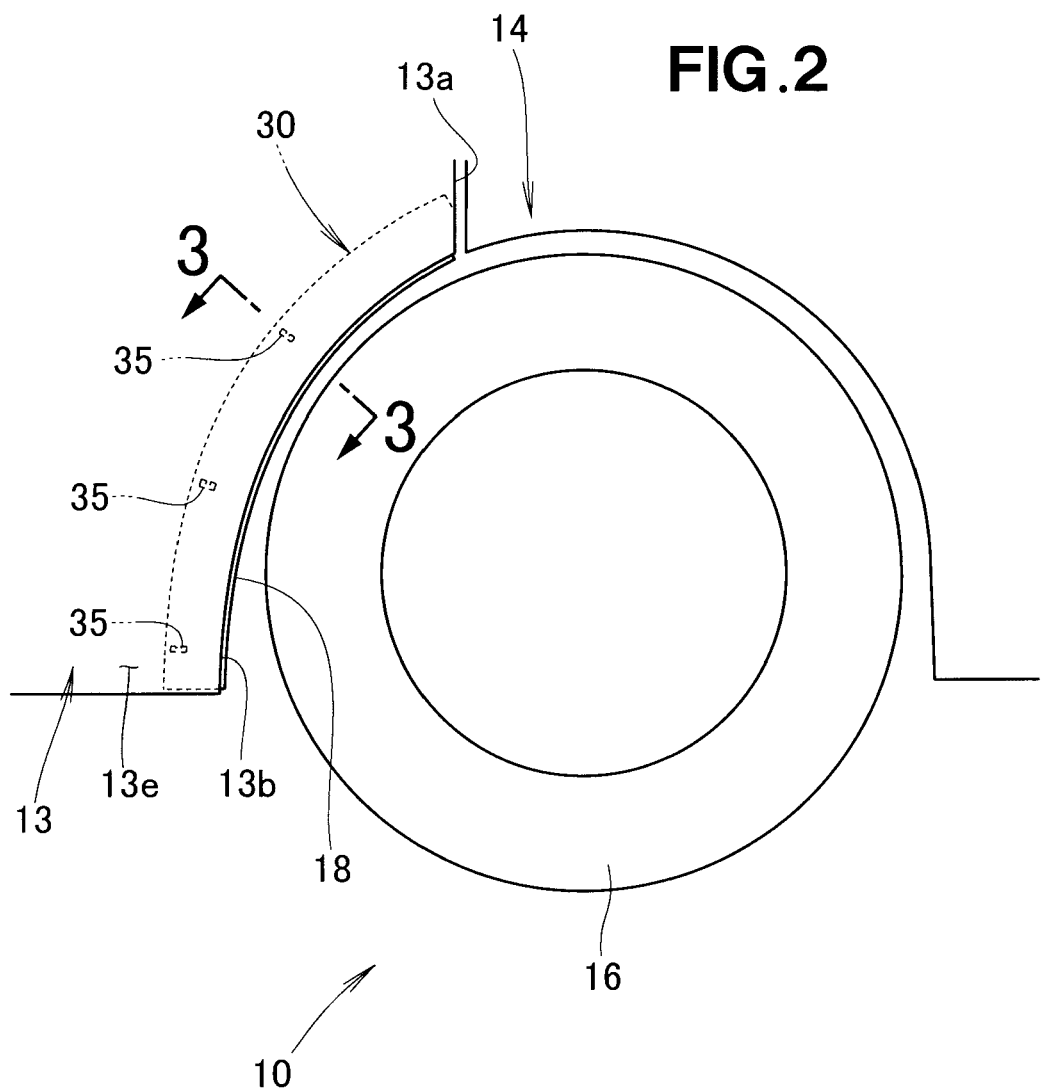
FIG. 2 is an enlarged side elevational view illustrating, along with a rear wheel, the rear door of FIG. 1 in a closed state.

As shown in FIGS. 1 and 2, a vehicle 10 is provided with left and right front doors 12 and left and right rear doors 13 on a vehicle body 11. The front doors 12 and the rear doors 13 are swinging-type side doors provided to lateral surfaces of the vehicle body 11.

Directions based on the vehicle 10 are defined as follows. The longitudinal direction of the vehicle 10 will be defined as "longitudinal." The widthwise direction of the vehicle 10 will be defined as "lateral." An orientation toward the inside in the widthwise direction of the vehicle 10 will be defined as "vehicle-interior facing." An orientation toward the outside in the widthwise direction of the vehicle 10 will be defined as "vehicle-exterior facing." The vertical direction of the vehicle 10 will be defined as "vertical."

The vehicle body 11 has side-outer panels 14 (vehicle-body panels 14), which constitute outer plates on the left and right sides, and rear-wheel housings 15. The wheel housings 15 are formed substantially in a half-circle shape so as to cover the outer circumferential surfaces of the upper half of rear wheels 16.

The rear doors 13 (side doors 13) are positioned adjacent to and in front of the rear wheels 16. A lower-rear portion of edges 13a of the rear doors 13 is notched substantially in an arcuate shape when viewed from the side so as to follow the contours of the rear wheels 16. The resulting notched portion 13b is referred to as the cutout part 13b. A wheel-arch protector 30 is mounted at the cutout part 13b.

Figure 3:
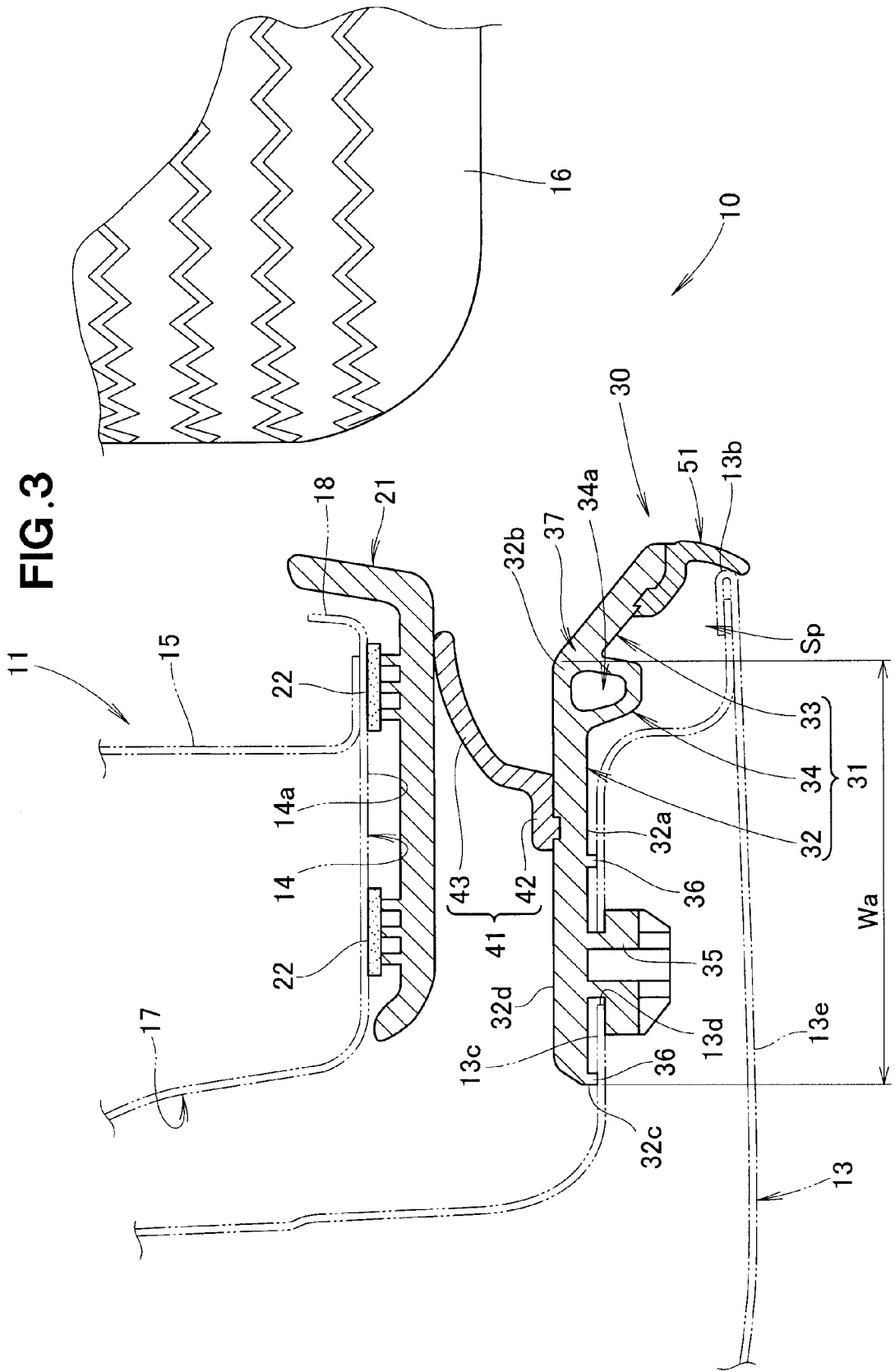
FIG. 3 is a cross-sectional view taken along line 3-3 of FIG. 2.

The side-outer panels 14 have a door opening 17 and a wheel arch 18 that are present on respective outer surfaces 14a (panel surfaces 14a) of the vehicle in the widthwise direction. The door openings 17 are opened and closed by the rear doors 13. The wheel arches 18 are obtained by cutting out the side-outer panels 14 so as to form the rims of the rear-wheel housings 15. In other words, the wheel arches 18 are formed substantially in an arcuate shape when viewed from the side so as to follow the contours of the rear wheels 16, as shown in FIGS. 2 and 3. The wheel arches 18 are joined to the edges of the rear-wheel housings 15 that open to the sides (rear-wheel sides).

The side-outer panels 14 may be further provided with wheel-arch garnishes 21 positioned so as to overlap the closed rear doors 13; i.e., positioned so as to overlap the wheel-arch protectors 30, as shown in FIG. 3.

Dirt, dust, or other foreign matter may become caught between the side-outer panels 14 and the wheel-arch protectors 30 when the wheel-arch protectors 30 directly contact the side-outer panels 14 upon closing the rear doors 13. The wheel-arch garnishes 21 are consequently interposed between the side-outer panels 14 and the wheel-arch protectors 30 in order to protect the painted surfaces of the side-outer panels 14.

The wheel-arch garnishes 21 are formed substantially in an arcuate shape when viewed from the side so as to cover the wheel arches 18 from the outside in the widthwise direction of the vehicle and are attached to the outer surfaces of the side-outer panels 14 by, e.g., adhesive tape 22. The outer surfaces of the wheel-arch garnishes 21 are formed as flat planes following the panel surfaces 14a of the side-outer panels 14.

The wheel-arch garnishes 21 may be provided as necessary but are not essential.

The wheel-arch protector 30 will now be described in detail. The wheel-arch protector 30 covers the wheel arch 18 from the outside in the widthwise direction of the vehicle when the rear door 13 is closed and can be mounted on the cutout part 13b, as shown in FIGS. 2 and 3. The wheel-arch protector 30 is comprised of a protector body 31, a seal part 41, and a shielding part 51.

The protector body 31, the seal part 41, and the shielding part 51 are all formed substantially in an arcuate shape when viewed from the side so as to follow at least part of the contour of the cutout part 13b, as shown in FIGS. 3, 4, 7, and 8. In particular, the protector body 31 is curved up or down, left or right, and forward or backward as appropriate so as to match the region of the cutout part 13b of the rear door 13.

The protector body 31 is formed from a polymer material capable of elastically deforming. This material is typically a hard resin in order to increase rigidity. The hard resin is, e.g., a polypropylene resin or another thermoplastic olefin resin. The seal part 41 and the shielding part 51 are formed from a polymer material capable of elastically deforming. This material is typically a soft resin that elastically deforms more readily than the hard resin so as to allow greater pliability and elasticity than the protector body 31. The soft resin is miscible with the thermoplastic olefin resin for forming protector body 31 and is, e.g., a thermoplastic olefin elastomer or another thermoplastic elastomer. Miscibility is a property of affinity between two or more materials. The resins used are thus miscible, whereby the seal part 41 and the shielding part 51 can be heat-fused to the protector body 31 and tightly fixed together.

The protector body 31 is a molded article comprised of a mounting baseplate 32, a extending plate 33, and a distended part 34. The protector body 31 is formed by gas-assist molding (vacuum injection molding).

The mounting baseplate 32 is formed so as to cover a predetermined width Wa along a back surface 13c of the rear door 13 (vehicle-interior-facing surface 13c of the rear door 13), as shown in FIGS. 3 through 5 and 8. The mounting baseplate 32 is designed to able to be mounted on the back surface 13c of the rear door 13. The mounting baseplate 32 is, e.g., laid across the back surface 13c of the rear door 13 and mounted on the rear door 13 using a plurality of locking parts 35 and screws 61 (see FIG. 8). The locking parts 35 are formed integrally with a vehicle-exterior-facing surface 32a of the mounting baseplate 32 and are interlocked with, and thereby fastened to, locking holes 13d of the rear door 13.

Figure 4:
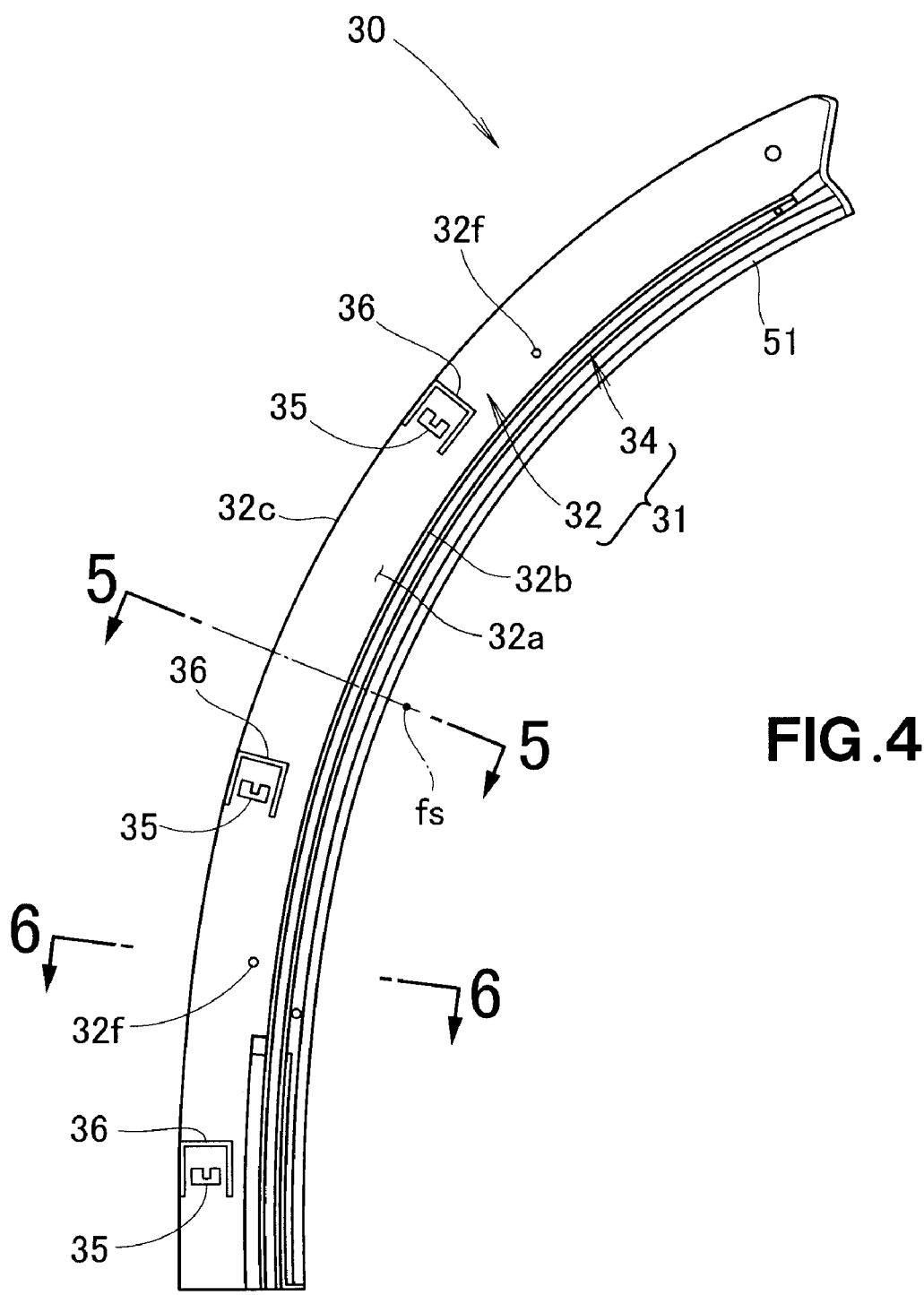
FIG. 4 is an enlarged view showing the wheel-arch protector of FIG. 2, as seen from outside transversely of the vehicle.

The mounting baseplate 32 has a plurality of ribs 36 on the vehicle-exterior-facing surface 32a, as shown in FIGS. 3 and 4. The ribs 36 are positioned on the vehicle-exterior-facing surface 32a so as to surround the locking parts 35. The mounting baseplate 32 is formed in a flat plate shape. On the other hand, the back surface 13c of the rear door 13 is not completely flat. The height of the ribs 36 is set so as to allow the wheel-arch protector 30 to be prevented from rattling against the non-planar back surface 13c when the locking parts 35 are interlocked with the locking holes 13d.

The extending plate 33 extends from an end 32b in the width direction of the mounting baseplate 32 (the end 32b on the small-diameter side of the arc-shaped mounting baseplate 32) along the cutout part 13b toward the outside in the widthwise direction of the vehicle until reaching the vicinity of the proximal edge of the rear door 13 (extends toward a front surface 13e of the rear door 13). A space is present between a distal end 33a of the extending plate 33 and the cutout part 13b of the rear door 13.

Figure 7:
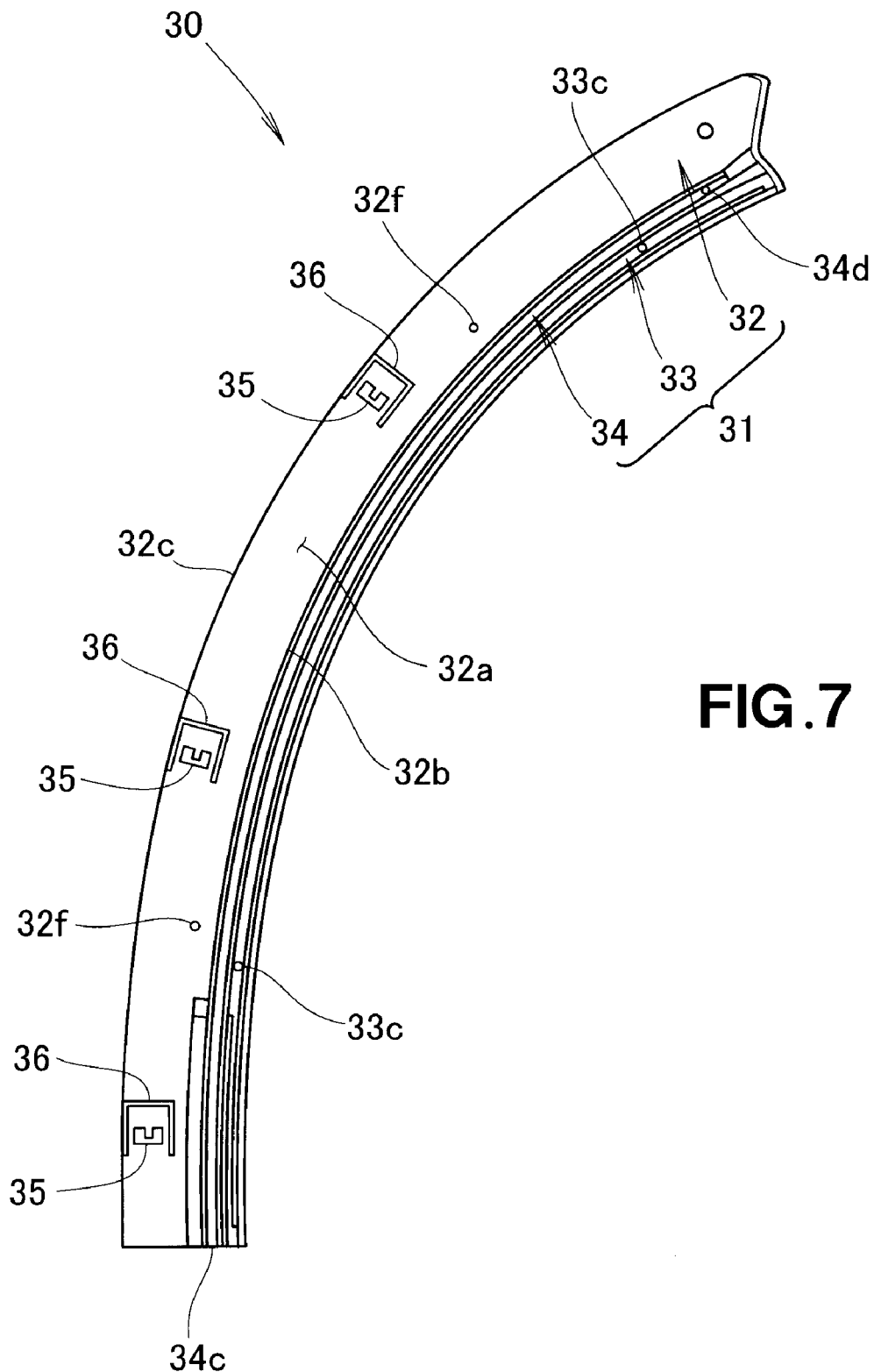
FIG. 7 is a schematic view illustrating a body of the protector of FIG. 4.
Figure 8:
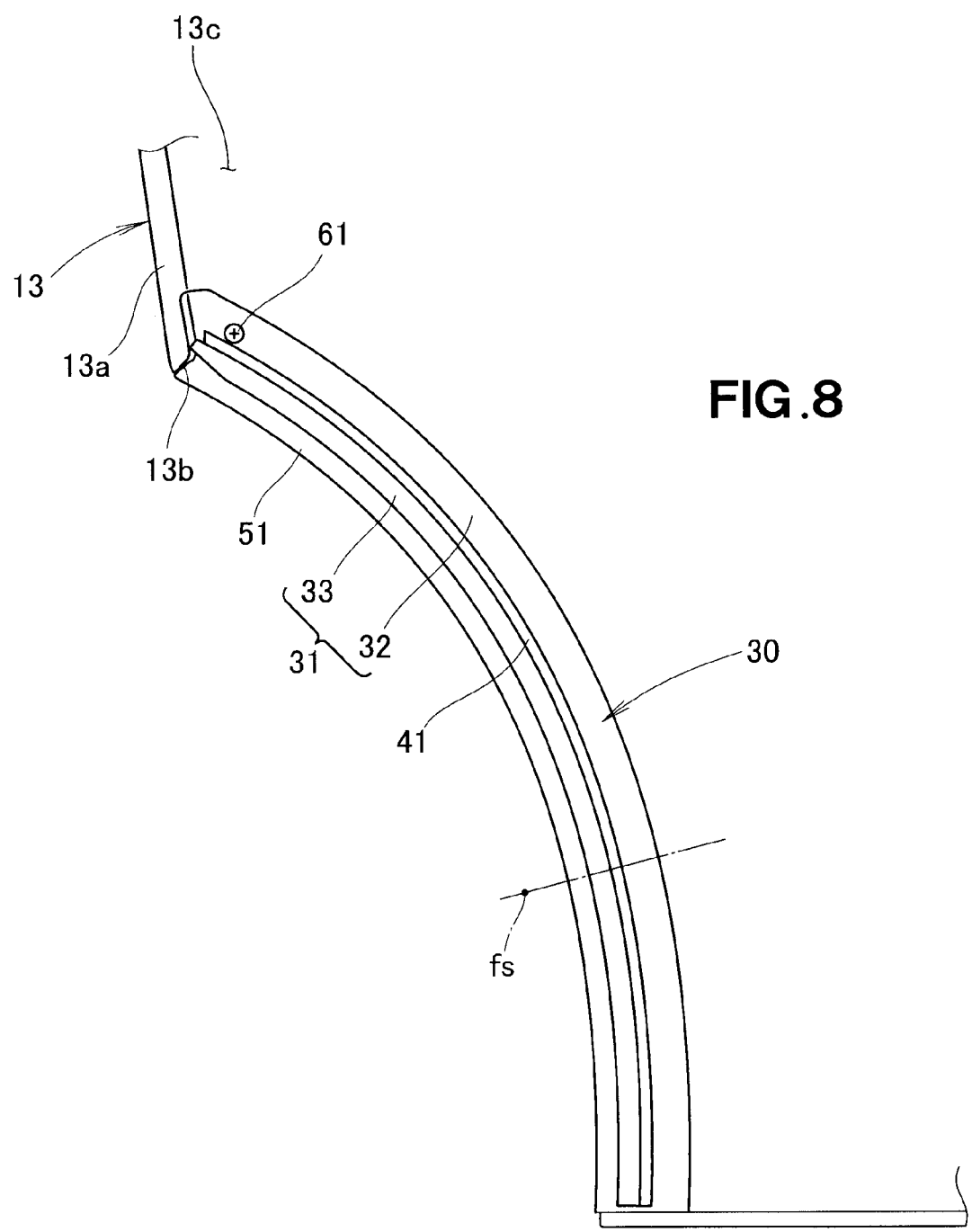
FIG. 8 is a perspective view showing the rear door and the wheel-arch protector of FIG. 1.

The distended part 34 is distended to the outside in the widthwise direction of the vehicle from a vehicle-exterior-facing surface 37a of a corner 37 (the portion 37a of the inside angle of the corner 37) between the mounting baseplate 32 and the extending plate 33, as shown in FIGS. 3 through 5, 7, and 8. The distended part 34 is formed to be long and thin so as to follow the cutout part 13b and has a hollow part 34a (cavity 34a) on the inside that is long and thin so as to follow the cutout part 13b. When the protector body 31 is molded by gas-assist molding, the hollow part 34a is molded simultaneously by the flow path of the gas (not shown). The gas flow path is connected to a gas injection port 34c and a gas ejection port 34d, as shown in FIG. 7.

As shown in FIG. 5, [the thickness] from a vehicle-interior-facing surface 32d of the mounting baseplate 32 to a wall 34b for forming the hollow part 34a is a minimal thickness Tm. The plate thickness of the mounting baseplate 32 and the extending plate 33 is Ta. The minimal thickness Tm is set to be equal to or less than the plate thickness Ta of the mounting baseplate 32.

The distended part 34 is thus distended to the outside in the widthwise direction of the vehicle from the vehicle-exterior-facing surface 37a of the corner 37 between the mounting baseplate 32 and the extending plate 33. The corner 37 can therefore be kept rigid by the distended part 34. As a result, the rigidity of the entire wheel-arch protector 30 increases. The durability of the corner 37 can also be maintained even when external forces; e.g., the impact of rocks kicked up by the rear wheel 16 (see FIG. 2), act on the corner 37.

The hollow part 34a is formed inside the distended part 34, and therefore the substantive thickness Tm of the corner 37 can be reduced in comparison to the surroundings of the corner 37, despite the presence of the distended part 34 at the corner 37. Sink marks (dents in the surface of a molded article) that cause changes in the thickness of the molded article can therefore be prevented from appearing in the portion of the corner 37 when the protector body 31 is molded.

The seal part 41 is comprised of a basal part 42 and a seal-lip part 43, as shown in FIGS. 3 through 5. The basal part is formed integrally with the vehicle-interior-facing surface 32a of the mounting baseplate 32, and the seal-lip part is formed integrally with the basal part 42.

The basal part 42 is set apart toward another end 32c in the width direction of the mounting baseplate 32 relative to the hollow part 34a. Specifically, the basal part 42 is integrally formed on the mounting baseplate 32 set apart by a distance Lb towards the side opposite the extending plate 33 (the side of the other end 32c) relative to the wall 34b for forming the hollow part 34a. In other words, a first end part E1 toward the rear wheel 16 (see FIG. 3) and a second end part E2 on the opposite side from the rear wheel 16 are separated by the distance Lb on the cross-section of a perpendicular surface fs (see FIG. 4) in the direction following the cutout part 13b of the seal part 41, as shown in FIGS. 4 and 5. The first end part E1 is an end of the wall 34b. The second end part E2 is an end of the basal part 42.

Heat and pressure are applied to the boundary (contacting surface 42a) between the basal part 42 and the protector body 31 in a step described hereinafter for integrally molding the basal part 42 of the seal part 41 on the mounting baseplate 32. However, the basal part 42 is set apart from the hollow part 34a. The heat and pressure generated during the aforementioned step accordingly do not exert a direct effect on the wall 34b for forming the hollow part 34a. Therefore, the wall 34b for forming the hollow part 34a can be kept from breaking, and the corner 37 can be kept rigid and durable.

A width Wb of the basal part 42 in the cross-section of the perpendicular surface fs (see FIG. 4) in the direction along the cutout part 13b of the seal part 41 is made larger than a thickness Tr of the seal-lip part 43, as shown in FIGS. 4 and 5. Thus, since the width Wb of the basal part 42 is made larger than the thickness Tr of the seal-lip part 43, the area of contact between the portion at the base of the seal part 41 and the mounting baseplate 32 can be adequately large. The seal part 41 can therefore be tightly integrated with the mounting baseplate 32.

Figure 9:
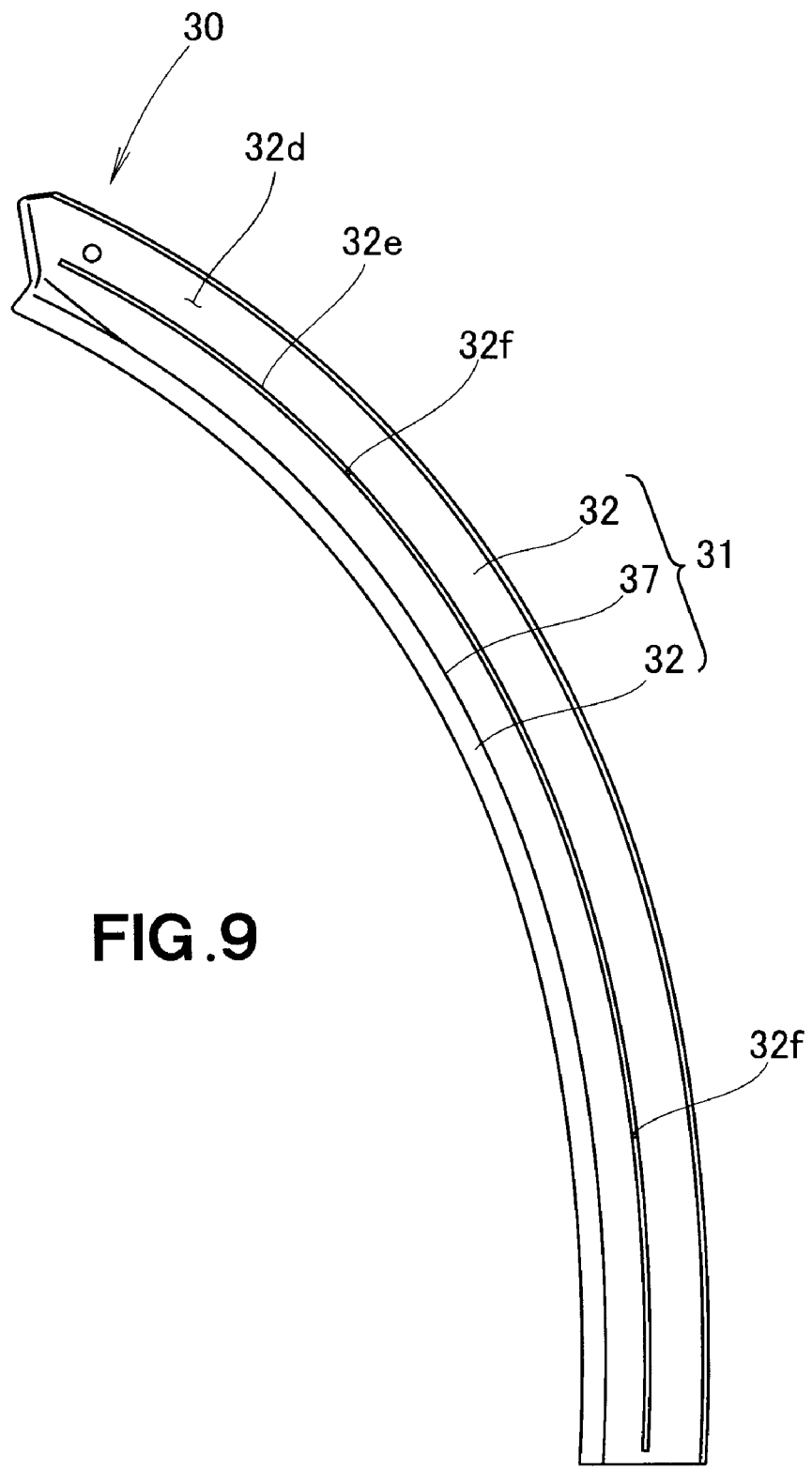
FIG. 9 is a schematic view a body of the protector body of FIG. 8.

The mounting baseplate 32 and the basal part 42 are integrally formed having concave and convex parts 32e, 42b that fit together. Specifically, the mounting baseplate 32 has a groove 32e (convex part 32e) formed long and thin on the vehicle-interior-facing surface 32d so as to follow the cutout part 13b, as in FIGS. 3, 5, and 9. On the other hand, the basal part 42 has a convex ridge 42b (convex part 42b) on the surface 42a (contacting surface 42a) facing the mounting baseplate 32. The convex ridge is shaped to be capable of fitting in the groove 32e. The convex ridge 42b is formed long and thin so as to follow the cutout part 13b. The area of contact between the portion (the contacting surface 42a) at the base of the seal part 41 and the mounting baseplate 32 can therefore be adequately large. The seal part 41 can therefore be integrated even more tightly with the mounting baseplate 32.

The mounting baseplate 32 has a through-hole 32f passing through the front-back direction of the mounting baseplate 32, as shown in FIGS. 4 and 6. The basal part 42 has an anchor part 42c that is sunk into the through-hole 32f. The anchor part 42c is formed from the same material as the basal part 42. The anchor part 42c is therefore sunk into and integrally formed with the through-hole 32f, and therefore the area of contact between the portion (the contacting surface 42a) at the base of the seal part 41 and the mounting baseplate 32 can be adequately large. The seal part 41 can therefore be integrated even more tightly with the mounting baseplate 32.

The through-hole 32f and the anchor part 42c are formed in a tapered shape, narrowing from a distal end 42d of the anchor part 42c toward the basal part 42. In other words, a diameter d1 of a base end 42e of the anchor part 42c is smaller than a diameter d2 of the distal end 42d. The angle at which the anchor part 42c tapers is θ. This configuration ensures that the basal part 42 of the seal part 41 does not slip out from the mounting baseplate 32 toward the side-outer panel 14 (see FIG. 3).

The seal-lip part 43 is designed to seal the space between the outer surface 14a of the side-outer panel 14 and the mounting baseplate 32 when the rear door 13 is completely closed, as shown in FIG. 3. Specifically, the seal-lip part 43 extends from the basal part 42 toward the outer surface 14a of the side-outer panel 14 when the rear door 13 is completely closed. The seal-lip part 43 is designed to then directly and sealably contact the outer surface 14a of the side-outer panel 14 or to sealably contact the wheel-arch garnish 21.

The seal-lip part 43 extends from the basal part 42 while curving and slanting toward the side-outer panel 14 and toward the rear of the vehicle body, as shown in FIGS. 3 and 5. The elastic seal-lip part 43 therefore flexes and contacts a wide area while slanting toward the side-outer panel 14. Therefore, the seal between the side-outer panel 14 and the seal-lip part 43 improves, water droplets are effectively prevented from seeping into a vehicle interior 19 (see FIG. 1) from outside, and favorable sound insulation is exhibited. Even when external forces; e.g., the impact from rocks kicked up by the rear wheel 16, act on the seal-lip part 43, the seal-lip part 43 is not readily broken, and the seal between the side-outer panel 14 and the seal-lip part 43 can be maintained.

The seal-lip part 43 has an inflection point 43b between the basal part 42 and a distal end 43a. A distal portion 43d from the inflection point 43b to the distal end 43a is slanted relative to a basal portion 43c from the basal part 42 to the inflection point 43b. When the distal end 43a of the seal-lip part 43 elastically contacts the side-outer panel 14 or the garnish 21, the distal portion 43d therefore undergoes significant elastic deformation based at the inflection point 43b. The distal portion 43d is shorter than the full length of the seal-lip part 43, and therefore the force with which the distal end 43a of the seal-lip part 43 contacts the side-outer panel 14 or the garnish 21 is larger than if the inflection point 43b was not present by a factor that is inversely proportional to the ratio of the lengths. As a result, the seal between the side-outer panel 14 or the garnish 21 and the seal-lip part 43 is further improved.

The shielding part 51 is a member for shielding the cutout part 13b of the rear door 13 from the rear. The shielding part plugs a gap Sp between the distal end 33a of the extending plate 33 and the cutout part 13b of the rear door 13. A basal part 52 of the shielding part 51 is integrally formed with a vehicle-exterior-facing surface 33b of the extending plate 33. The extending plate 33 and the basal part 42 are integrally formed having concave and convex parts that fit together. The shielding part 51 is capable of elastically deforming and can be formed using the same material as the material for forming the seal part 41. The shielding part 51 can therefore absorb the dimensional tolerance of the gap Sp between the cutout part 13b of the rear door 13 and the distal end 33a of the extending plate 33. As a result, the external appearance surrounding the cutout part 13b of the rear door 13 is excellent.

Following is a summary of the descriptions above. The wheel-arch protector 30 comprises the protector body 31, which is made of a hard resin; and the seal part 41, which is made of a soft resin. The space between the side-outer panel 14 or the garnish 21 and the mounting baseplate 32 can therefore be adequately sealed by the seal part 41 when the door opening 17 of the side-outer panel 14 is closed by the rear door 13. The seal part 41 prevents water droplets from seeping into the vehicle interior 19 from the outside and exhibits excellent sound insulation. The seal part 41 is also pliable, and accordingly highly durable as well as being less likely to break even upon impact from rocks or other kicked-up projectiles.

An example of a method for molding the wheel-arch protector 30 will be described next. The wheel-arch protector 30 is molded integrally from two types of resin; i.e., a hard resin and a soft resin, as described above. The wheel-arch protector 30 is therefore molded using, e.g., so-called insert injection molding (also referred to as double-shot molding). Insert injection molding is a well-known molding method.

As used in the present invention, insert injection molding refers to a molding method in which the molten hard resin is first injected into a die assembly and cooled, whereby the protector body 31 that acts as a primary product is molded, and then the molded protector body 31 is set in a different die assembly, and the molten soft resin is injected and cooled, whereby the seal part 41 and the shielding part 51 are molded integrally with the protector body 31 as a secondary molded article. By using insert injection molding, the seal part 41 and the shielding part 51 made of the soft resin can be reliably integrated with the protector body 31 made of the hard resin.

Figure 10:
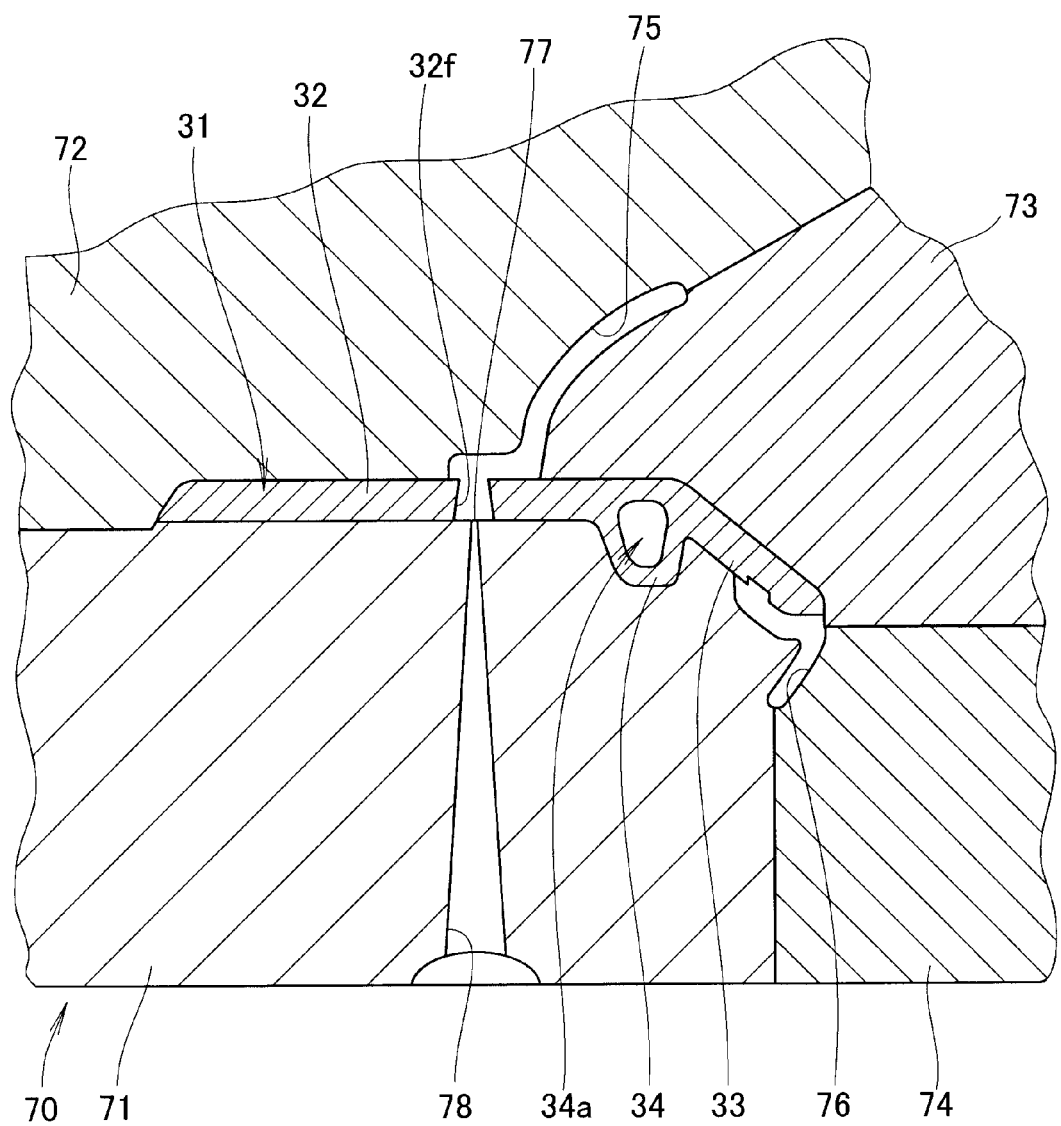
FIG. 10 is a cross-sectional view illustrating an example die assembly for molding the wheel-arch protector of FIG. 6.
Figure 11A:
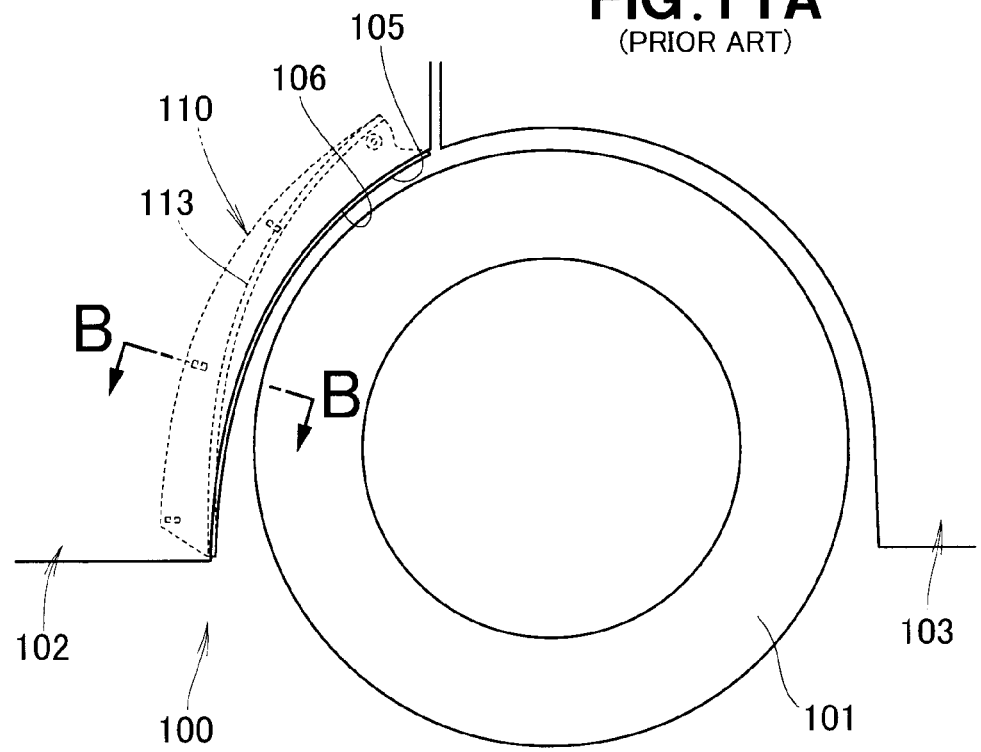
FIGS. 11A and 11B are schematic views illustrating a vehicle provided with a conventional wheel-arch protector.
Figure 11B:
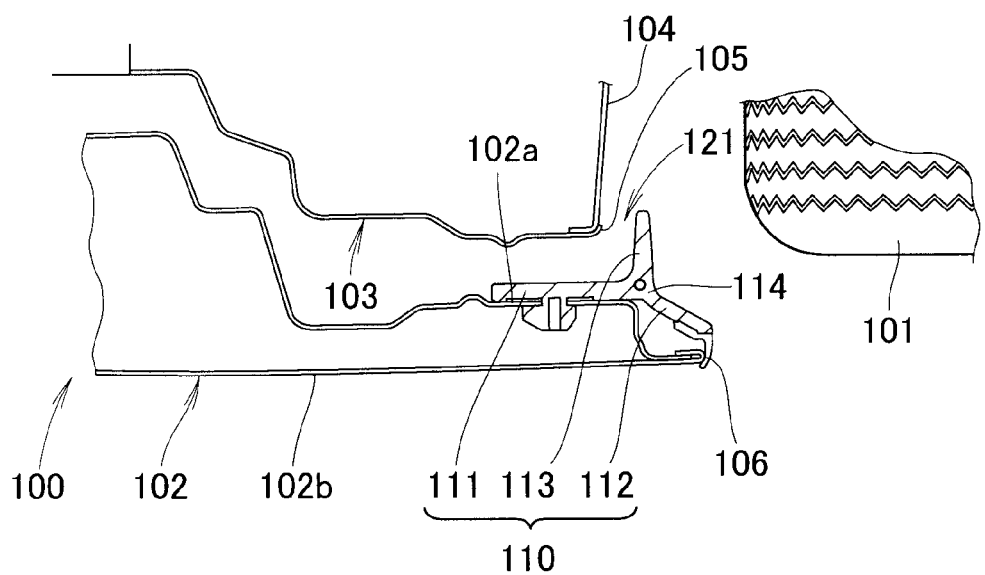

An example of a die assembly for molding the wheel-arch protector 30 using insert injection molding is shown in FIG. 10. A die assembly 70 is assembled from one static die 71 and three movable dies 72, 73, and 74 when molding the seal part 41 and the shielding part 51 that become the secondary molded article. A first cavity 75 and a second cavity 76 are provided within the die assembly 70. The first cavity 75 communicates with a sprue 78 via the through-hole 32f formed in the protector body 31 and a first gate 77. The second cavity 76 communicates with the sprue 78 via a second gate (not shown) formed at a location corresponding to a hole 33c in the protector body 31 (see FIG. 7).

The molten soft resin is injected from the nozzle of an injection-molding machine (not shown) into the sprue 78 via an appropriate runner (not shown). The molten material that has flowed into the sprue 78 flows through the sprue 78, the first gate 77, and the through-hole 32f into the first cavity 75. As a result, the seal part 41 is integrally formed with the protector body 31, as shown in FIG. 6. The anchor part 42c is also molded from the molten material that has flowed into the through-hole 32f. The shielding part 51 is also formed integrally with the protector body 31 in a similar manner.

The wheel-arch protector 30 for a vehicle in the present invention can be applied for use in the vehicle body of a passenger car or other vehicle.

Obviously, various minor changes and modifications of the present invention are possible in light of the above teaching. It is therefore to be understood that within the scope of the appended claims the invention may be practiced otherwise than as specifically described.

What is claimed is:

1. A vehicular wheel-arch protector mounted to a cutout part at an edge of a side door of a vehicle, the cutout part being formed to follow a contour of a rear wheel of the vehicle, the side door being positioned adjacent to and forwardly of the rear wheel for opening and closing a door opening formed in a vehicle-body panel forming a lateral side part of the vehicle, the wheel-arch protector comprising:

a protector body formed from a polymer material; and a seal part formed from a polymer material that elastically deforms more readily than the polymer material for forming the protector body, both the protector body and the seal part being formed to follow at least a part of a contour of the cutout part, wherein the protector body comprises:

a mounting baseplate formed at a predetermined width corresponding to a vehicle-interior-facing surface of the side door and mounted on the vehicle-interior-facing surface;

a extending plate extending from a first widthwise end of the mounting baseplate along the cutout part toward outside in a widthwise direction of the vehicle; and a distended part distended toward the outside in the widthwise direction of the vehicle from a vehicle-exterior-facing surface of a corner between the mounting baseplate and the extending plate, wherein the distended part is long and thin so as to follow the cutout part and having a hollow part that is long and thin so as to follow the cutout part, wherein the seal part has a basal part formed integrally with a vehicle-interior-facing surface of the mounting baseplate and a seal-lip part formed integrally with the basal part, the basal part being positioned away from the hollow part toward a second widthwise end of the mounting baseplate, the seal-lip part being designed to seal a space between an outer surface of the vehicle-body panel and the mounting baseplate in a state in which the side door is closed, and wherein the mounting baseplate has a through-hole passing through a front-back direction of the mounting baseplate, the basal part has an anchor part filled into the through-hole, and the anchor part is formed from the same material as the basal part.

2. The protector of claim 1, wherein the through-hole and the anchor part taper to a small diameter from a distal end of the anchor part to a vicinity of the basal part.

* * * * *